United States Patent
Jain et al.

(10) Patent No.: US 11,042,694 B2
(45) Date of Patent: Jun. 22, 2021

(54) DOCUMENT BEAUTIFICATION USING SMART FEATURE SUGGESTIONS BASED ON TEXTUAL ANALYSIS

(71) Applicant: Adobe Inc., San Jose, CA (US)

(72) Inventors: Arihant Jain, Noida (IN); Mudit Rastogi, Noida (IN); Mohammad Javed Ali, Noida (IN); Ankur Murarka, Bengaluru (IN); Amit Gaurav, Noida (IN)

(73) Assignee: Adobe Inc., San Jose, CA (US)

( * ) Notice: Subject to any disclaimer, the term of this patent is extended or adjusted under 35 U.S.C. 154(b) by 72 days.

(21) Appl. No.: 16/251,151

(22) Filed: Jan. 18, 2019

(65) Prior Publication Data

US 2019/0155882 A1    May 23, 2019

Related U.S. Application Data

(63) Continuation of application No. 15/694,173, filed on Sep. 1, 2017, now Pat. No. 10,223,341.

(51) Int. Cl.
*G06F 40/166* (2020.01)
*G06K 9/00* (2006.01)
(Continued)

(52) U.S. Cl.
CPC .......... *G06F 40/166* (2020.01); *G06F 40/103* (2020.01); *G06K 9/00442* (2013.01);
(Continued)

(58) Field of Classification Search
CPC .... G06F 17/24; G06F 17/214; G06F 3/04842; G06F 40/166; G06F 40/103;
(Continued)

(56) References Cited

U.S. PATENT DOCUMENTS

| 5,615,320 A | 3/1997 | Lavendel |
| 5,859,644 A | 1/1999 | Stokes et al. |

(Continued)

OTHER PUBLICATIONS

Vera Chen; 2 Quick Ways to Select Texts with Similar or Same Formatting in Your Word Document; Dec. 5, 2016; DataNumen Inc.; www.datanumen.com/blogs/2-quick-ways-select-texts-similar-formatting-word-document/; 10 Pages.*

*Primary Examiner* — Andrew R Dyer
(74) *Attorney, Agent, or Firm* — Finch & Maloney PLLC

(57) ABSTRACT

Techniques are provided for a computer processor-implemented method of beautifying an electronic textual document having text organized in a plurality of sections. Each of the sections is representative of a corresponding one of a plurality of textual elements. The method includes: receiving a user selection of the text for beautification, the selected text including at least a portion of one of the sections; classifying the selected text as the corresponding one of the textual elements represented by the one of the sections; ranking a set of attributes applicable to the one of the textual elements; presenting an ordered list of the highest-ranked attributes; in response to receiving a selection of one or more of the presented attributes, applying the selected attributes to the selected text; and reranking the applicable attributes to reflect the selected attributes.

20 Claims, 8 Drawing Sheets

(51) Int. Cl.
  *G06K 9/20* (2006.01)
  *G06F 40/103* (2020.01)
  *G06F 3/0484* (2013.01)
  *G06F 40/109* (2020.01)

(52) U.S. Cl.
  CPC ....... *G06K 9/00456* (2013.01); *G06K 9/2081* (2013.01); *G06F 3/04842* (2013.01); *G06F 40/109* (2020.01); *G06K 2209/01* (2013.01)

(58) Field of Classification Search
  CPC .............. G06F 40/109; G06K 9/00456; G06K 9/00442; G06K 9/2081; G06K 2209/01
  USPC .......................... 715/229, 255, 256, 271, 272
  See application file for complete search history.

(56) References Cited

U.S. PATENT DOCUMENTS

| | | | |
|---|---|---|---|
| 6,580,438 B1* | 6/2003 | Ichimura | G06F 40/103 715/732 |
| 6,920,608 B1* | 7/2005 | Davis | G06F 17/2247 715/209 |
| 7,203,692 B2* | 4/2007 | Tabatabai | H04N 21/234318 |
| 7,360,155 B2* | 4/2008 | Vora | G10L 13/08 715/234 |
| 7,403,206 B1 | 7/2008 | Liu et al. | |
| 7,538,776 B2 | 5/2009 | Edwards et al. | |
| 7,779,362 B1* | 8/2010 | Castrucci | G06F 3/04842 715/763 |
| 8,181,104 B1* | 5/2012 | Helfand | G06F 40/166 715/234 |
| 8,416,255 B1 | 4/2013 | Gilra | |
| 8,418,059 B2* | 4/2013 | Kitada | G06F 40/166 715/275 |
| 9,239,865 B1 | 1/2016 | Balez et al. | |
| 9,715,484 B1 | 7/2017 | Joshi et al. | |
| 10,049,477 B1 | 8/2018 | Kokemohr et al. | |
| 10,614,392 B1* | 4/2020 | Mottram | G06Q 10/06312 |
| 10,628,525 B2* | 4/2020 | Fink | G06F 40/30 |
| 2003/0167442 A1 | 9/2003 | Hagerty et al. | |
| 2003/0231916 A1 | 12/2003 | Tagawa | |
| 2007/0030528 A1* | 2/2007 | Quaeler | G06F 16/33 358/453 |
| 2007/0074109 A1 | 3/2007 | Nagahara et al. | |
| 2007/0294610 A1* | 12/2007 | Ching | G06F 16/94 |
| 2008/0077845 A1* | 3/2008 | Cho | G06F 9/451 715/205 |
| 2008/0126481 A1 | 5/2008 | Chakra et al. | |
| 2008/0141123 A1* | 6/2008 | Kitada | G06F 3/04847 715/255 |
| 2008/0189600 A1* | 8/2008 | Lau | G06F 17/227 715/235 |
| 2008/0218632 A1* | 9/2008 | Jung | G11B 27/034 348/468 |
| 2008/0292190 A1 | 11/2008 | Biswas et al. | |
| 2009/0138257 A1* | 5/2009 | Verma | G06F 17/274 704/9 |
| 2010/0005386 A1* | 1/2010 | Verma | G06F 17/274 715/237 |
| 2010/0070908 A1 | 3/2010 | Mori et al. | |
| 2010/0131836 A1 | 5/2010 | Dukhon et al. | |
| 2011/0010665 A1* | 1/2011 | DeLuca | G06Q 10/107 715/810 |
| 2011/0016426 A1 | 1/2011 | Grosz et al. | |
| 2011/0047506 A1* | 2/2011 | Miller | G06F 9/543 715/808 |
| 2011/0252344 A1 | 10/2011 | Van Os | |
| 2011/0276632 A1* | 11/2011 | Anderson | G06Q 30/02 709/205 |
| 2011/0289407 A1 | 11/2011 | Naik et al. | |
| 2012/0324351 A1 | 12/2012 | Gao et al. | |
| 2013/0111324 A1 | 5/2013 | Kern et al. | |
| 2013/0129310 A1* | 5/2013 | Shustorovich | H04N 5/775 386/230 |
| 2014/0201672 A1 | 7/2014 | Borzello et al. | |
| 2014/0282178 A1 | 9/2014 | Borzello et al. | |
| 2014/0365881 A1* | 12/2014 | Suarez | G06F 40/109 715/269 |
| 2015/0074742 A1 | 3/2015 | Kohno et al. | |
| 2015/0097842 A1 | 4/2015 | Kaasila et al. | |
| 2015/0135127 A1 | 5/2015 | Patel et al. | |
| 2015/0370769 A1 | 12/2015 | Pereira Filho et al. | |
| 2016/0055132 A1 | 2/2016 | Garrison et al. | |
| 2016/0224684 A1* | 8/2016 | Corlett | G06F 3/04817 |
| 2016/0307347 A1 | 10/2016 | Matteson et al. | |
| 2016/0371312 A1* | 12/2016 | Ben-Aharon | G06F 40/14 |
| 2016/0373386 A1 | 12/2016 | Wang et al. | |
| 2017/0243028 A1* | 8/2017 | LaFever | G06F 21/6263 |
| 2017/0322910 A1 | 11/2017 | Dhanuka et al. | |
| 2018/0260176 A1 | 9/2018 | Arockiasamy et al. | |
| 2018/0336181 A1* | 11/2018 | Fink | G06F 40/109 |
| 2018/0336185 A1* | 11/2018 | Fink | G06F 40/30 |
| 2018/0366013 A1* | 12/2018 | Arvindam | G06F 40/205 |
| 2019/0012308 A1* | 1/2019 | Dvorak | G06F 17/2282 |

* cited by examiner

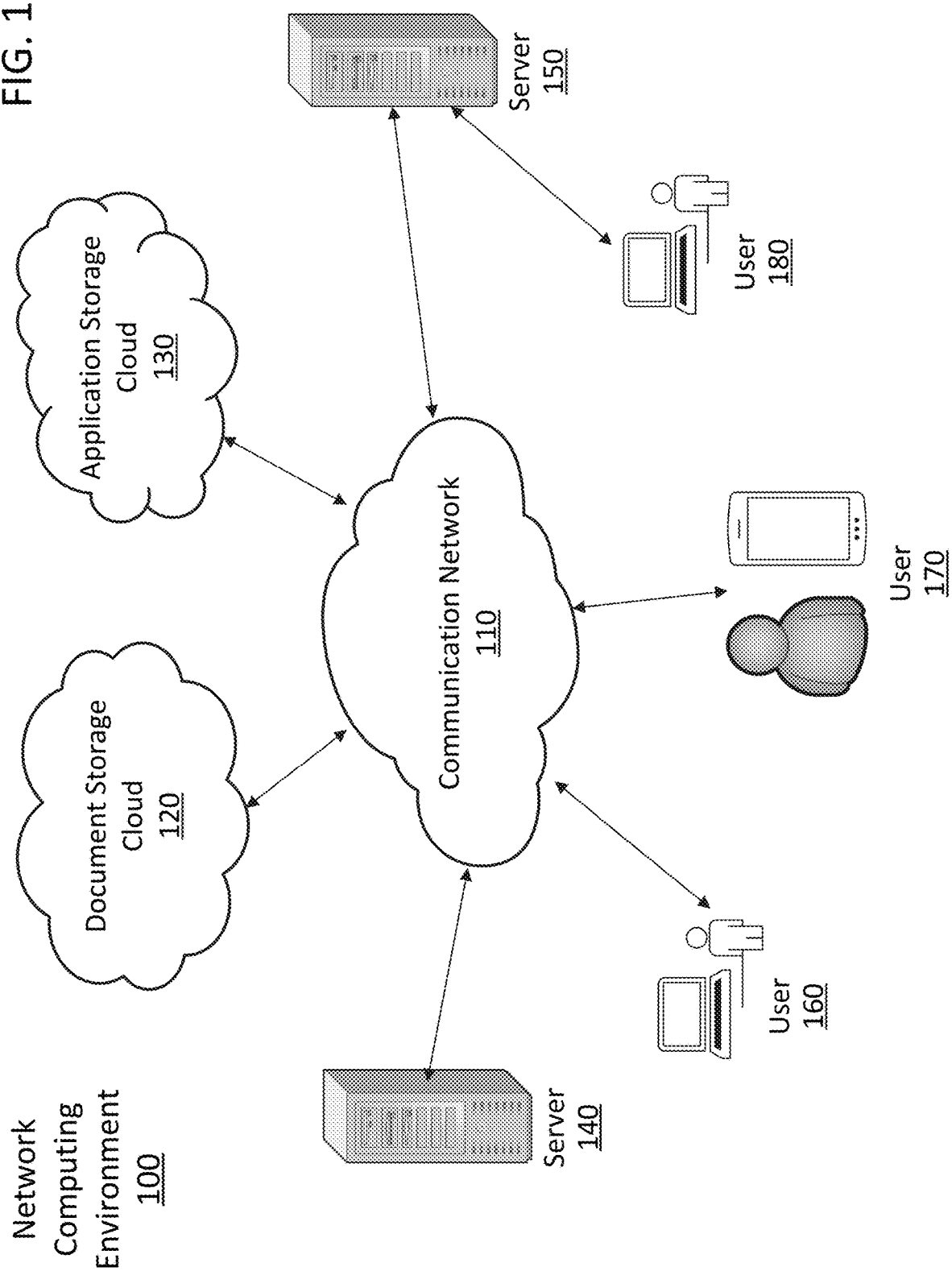

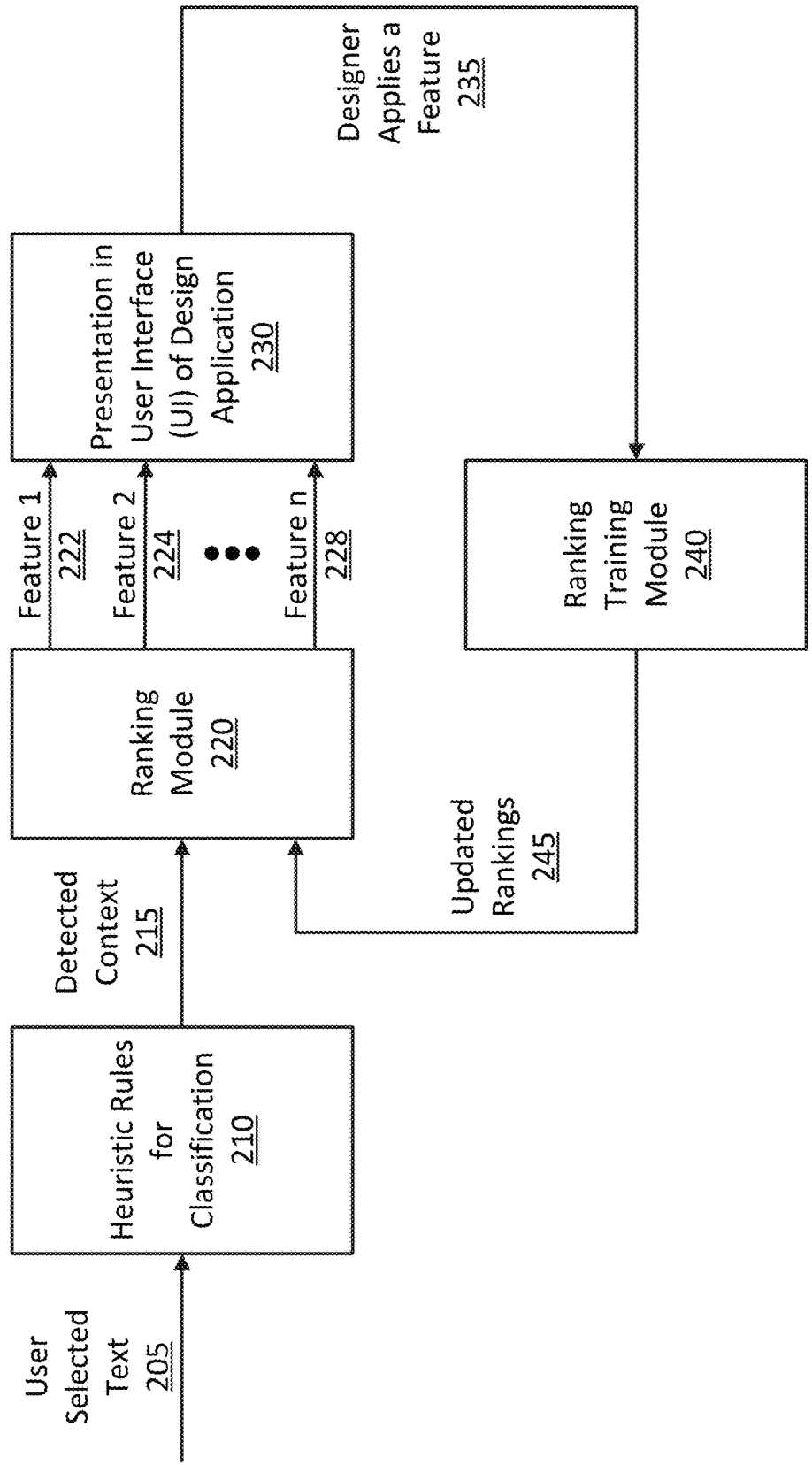

FIG. 4A

410 — The simplest types of chemical formulas are called empirical formulas, which use letters and numbers indicating the numerical proportions of atoms of each type. Name the organic compound. chain CH3CH2CH3CH2CH2CH3 Name Molecular formulas indicate the simple numbers of each with no information on structure. F formula for glucose is CH2 (twice a carbon and oxygen), while its mole hydrogen atoms, six carbon and oxy 420 —
- ☐ Subscript/Inferior  
  chain $CH_3CH_2CH_3CH_2CH_2CH$...
- ☐ All Small Caps  
  CHAIN CH3CH2CH3CH2CH2CH3
- ☐ Set 2  
  chain CH3CH2CH3CH2CH2C...

FIG. 4B

The simplest types of chemical formulas are called empirical formulas, which use letters and numbers indicating the numerical proportions of atoms of each type. Name the organic compound. chain CH3CH2CH3CH2CH2CH3 Name Molecular formulas indicate the simple numbers of eac with no information on structure. formula for glucose is CH2 (twice carbon and oxygen), while its mol hydrogen atoms, six carbon and ox 430 —
- ☐ All Small Caps  
  CHAIN CH3CH2CH3CH2CH2CH3
- ☐ Subscript/Inferior  
  chain $CH_3CH_2CH_3CH_2CH_2CH$...
- ☐ Set 2  
  chain CH3CH2CH3CH2CH2C...

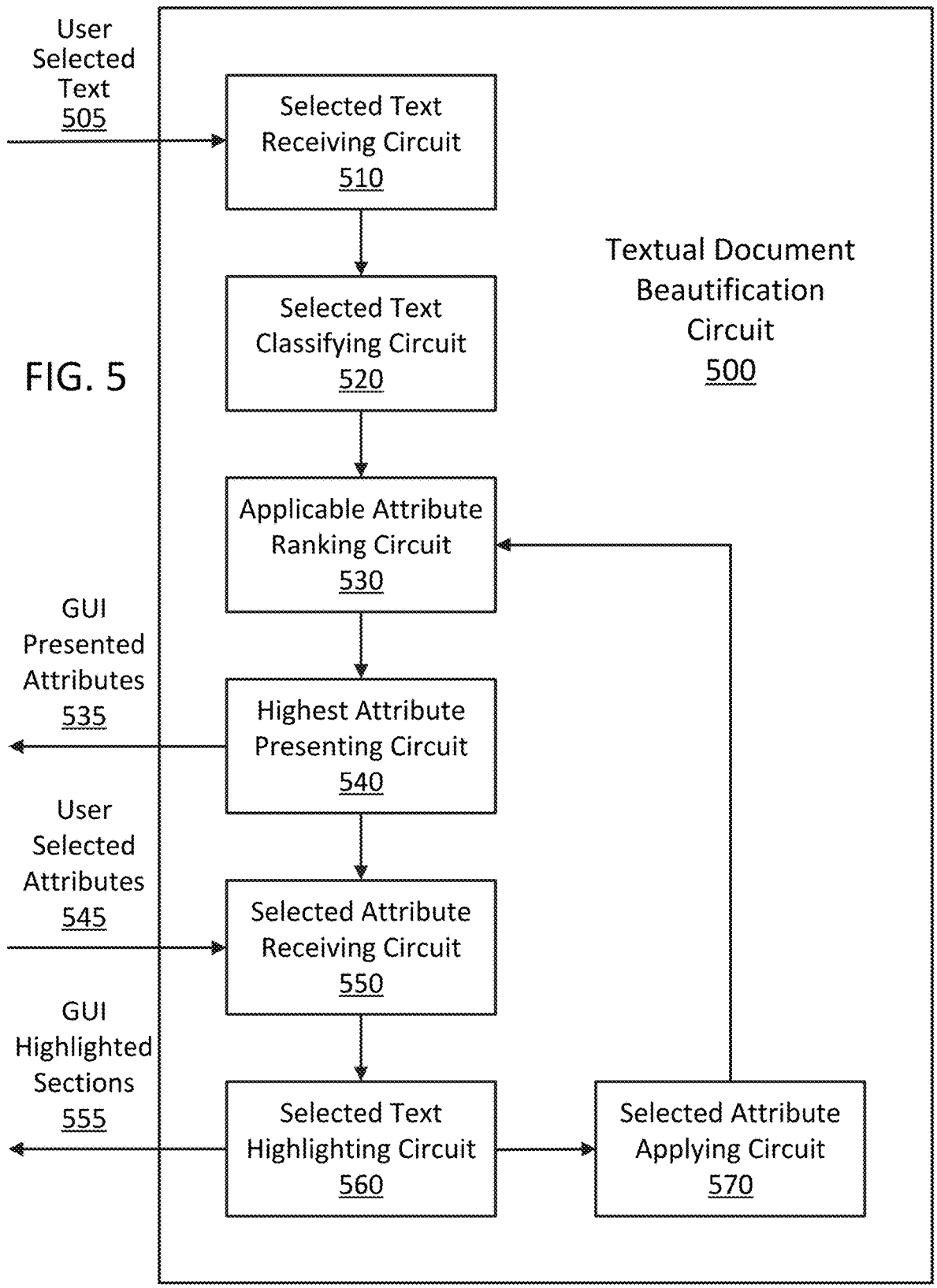

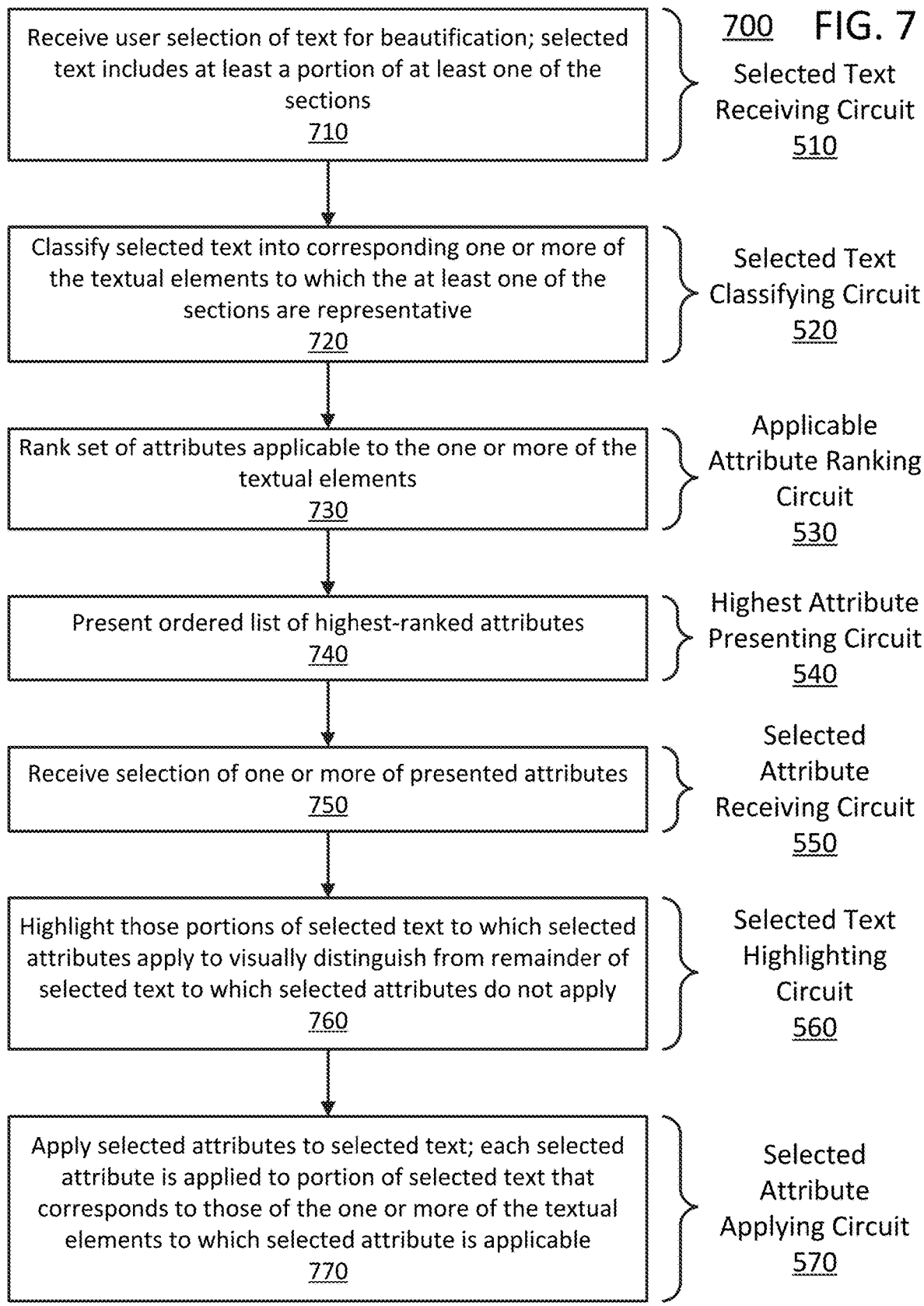

DOCUMENT BEAUTIFICATION USING SMART FEATURE SUGGESTIONS BASED ON TEXTUAL ANALYSIS

REFERENCE TO PRIOR APPLICATION

This application is a continuation of U.S. patent application Ser. No. 15/694,173 (filed 1 Sep. 2017), the entire disclosure of which is hereby incorporated by reference herein.

FIELD OF THE DISCLOSURE

This disclosure relates to document beautification smart feature suggestions based on textual analysis. The smart feature suggestions provided are useful, for instance, in assisting users in the beautification of digital documents.

BACKGROUND

In advanced-design layouts, articles, stories, books, and other document types are usually written by authors and editors in textual form using word processing editors like Google Docs, Microsoft Word, and the like. Once an article or other document is written by an author (and possibly revised by an editor), it is often passed onto a designer or other user to beautify (e.g., to make ready for publication or outside distribution) using a desktop publishing application, such as ADOBE® INDESIGN®. Beautification can take as much (or more) effort as the original writing and editing. Beautification frequently breaks down into two parts: exploring and applying. The exploring is the creative aspect of beautification, where the designer does the initial design work, exploring what kind of attributes go well with the document's various sections. The applying, on the other hand, is an editorial process, where the user finds the sections of a similar textual element (like the headings, sub-headings, and the like) and context, and applies the same attributes that the designer has already decided to use during the exploring.

For instance, textual documents are often composed of sections, where each section is a group of words (e.g., consecutive words) or other text that make up a specific kind of textual element, such as being part of the same title, heading, sub-heading, formula, paragraph body, caption, to name a few. In exploring, the designer is deciding the type of attributes such as font selection, features, sizes, and so on to apply to each of the various kinds of textual elements in the document. For example, exploration can take place in one portion of the document. However, the resulting effort to consistently apply these features in the proper context across a remaining portion of the document can make the entire beautification a highly time-consuming process.

BRIEF DESCRIPTION OF THE DRAWINGS

Features of embodiments of the claimed subject matter will become apparent as the following Detailed Description proceeds, and upon reference to the Drawings, wherein like numerals depict like parts.

FIG. 1 is a schematic diagram of an example network computing environment for implementing a self-learning model and apparatus for smart feature suggestions based on textual analysis, according to an embodiment of the present disclosure.

FIG. 2 is a block diagram illustrating an example apparatus for document beautification using smart feature suggestions based on textual analysis, according to an embodiment of the present disclosure.

FIGS. 4A-4B are screen shots of an example graphical user interface (GUI) for smart feature suggestions based on textual analysis, according to another embodiment of the present disclosure.

FIG. 5 is a block diagram of an example textual document beautification circuit as might be used in the apparatus of FIG. 2, according to an embodiment of the present disclosure.

FIG. 7 is a flow diagram of an example method of textual document beautification, according to another embodiment of the present disclosure.

Figure 3A:
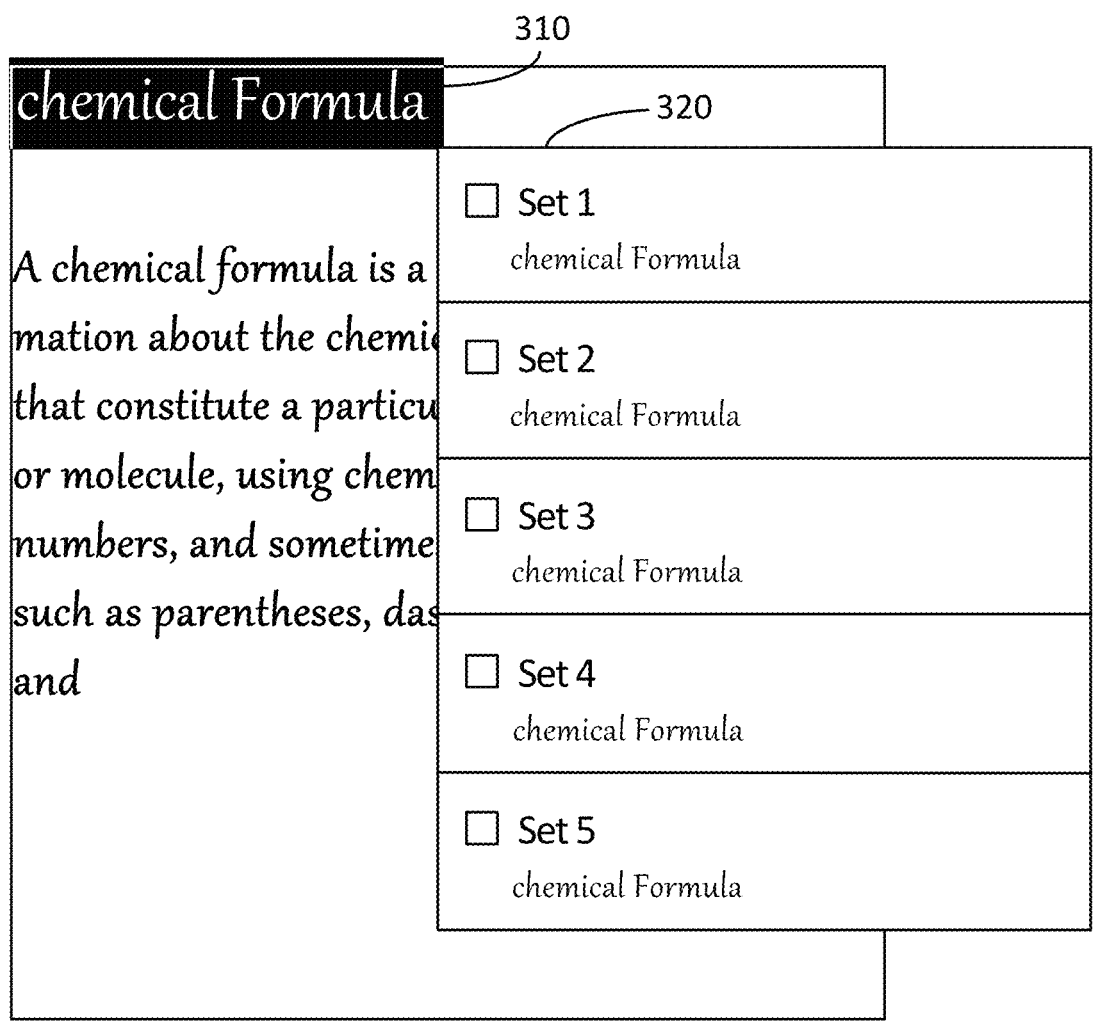
FIGS. 3A-3B are screen shots of an example graphical user interface (GUI) for smart feature suggestions based on textual analysis, according to an embodiment of the present disclosure.

Although the following Detailed Description will proceed with reference being made to illustrative embodiments, many alternatives, modifications, and variations thereof will be apparent to those in light of the present disclosure.

DETAILED DESCRIPTION

One or more embodiments of the present disclosure are directed toward enhancing a user's experience with the beautification of documents. In one embodiment, a method of electronic document beautification by a computer processor includes receiving a user selection of text for beautification. The selected text includes at least a portion of at least one section. The method further includes classifying the selected text into a corresponding at least one textual element for which the at least one section is representative. For instance, heuristic analysis can be used by the processor to automatically classify the selected section as the textual element for which the section is most representative. The method further includes ranking a set of attributes applicable to the at least one textual element. For example, the ranking of a particular attribute can reflect a likelihood of the user (e.g., as decided by the processor through analyzing the user's attribute selections over time) to apply that attribute to sections representative of the at least one textual element. Here, higher ranking can denote a higher likelihood of being applied by the user in this context than for other attributes less likely to be applied by the user. The method further includes presenting an ordered list of the highest-ranked attributes to the user, and receiving a selection of one or more of the presented attributes from the user.

The method can further include highlighting those portions of the selected text to which the selected attributes apply, to visually distinguish these portions from a remainder of the selected text (to which the selected attributes do not apply). The highlighting, for example, can be on a section-by-section basis, highlighting those sections for which at least one of the selected attributes applies. In another embodiment, the highlighting includes further analysis by the processor to identify the specific characters within the at least one section that are affected by the selected attributes, and highlighting only those characters. For instance, the highlighting can be done before applying the attributes, to provide a general or precise identification of the affected text. The method further includes applying the selected attributes to the selected text. Each selected attribute is applied to a portion of the selected text that corresponds to the at least one textual element to which the selected attribute is applicable. For example, the application can be selective on an attribute-by-attribute and section-by-section basis, depending on factors such as the text selected, the textual elements represented, and the attributes applicable to the represented textual elements. For instance, formulas in the selected text might undergo one beautification while headings might undergo another.

For example, a textual document being beautified can be a paper, article, book, a multimedia project, an advertisement, or the like, as supplied by a writer, editor, or other author. The document has text organized in a plurality of sections. For example, each section can be a group of words or characters (such as sequential or neighboring words or characters) that make up and represent a common textual element. Example textual elements include, for instance, a title or other heading, a mathematical or scientific formula, a foreign phrase, or a paragraph (such as a body paragraph), to name a few. The method includes receiving a user selection of the text for beautification. The selected text includes at least a portion of one of the sections (such as a first section). The method further includes classifying the selected text as the corresponding one of the textual elements (such as a first textual element) represented by the first section. The method further includes ranking a set of attributes (e.g., features) applicable to the first textual element, and presenting an ordered list of the highest-ranked attributes to the user. For example, the attributes can be font type, font size, and font qualities, such as position, emphasis, spacing, to name a few, and the ordered list can be an ordered drop-down menu or other GUI element. The method further includes receiving (for example, from a user) a selection of one or more of the presented attributes, applying the selected attributes to the selected text, and reranking the applicable attributes to reflect the selected attributes. For instance, the selected attributes can be ranked relatively higher than before they were applied to the selected text so that future presentations of the highest-ranked attributes will have the selected attributes appearing higher in the list.

In one or more embodiments of the present disclosure, attributes (or features) are considered applicable to a particular textual element type based on static and dynamic criteria. Applicable attributes, in turn, can be presented to a user in ordered lists of the highest-ranked applicable attributes. In some embodiments, attributes are decided to be applicable to a particular type of textual element when they are the default attributes for the textual element (e.g., subscript for chemical formula numbers), or when the user has chosen the attributes earlier in the document's beautification process (e.g., when selecting sections of only that type of textual element). For example, in some embodiments, the user can access any available attribute through a drop-down menu that is different than the presentation of the highest-ranked applicable attributes. In some embodiments, attributes may be designated as applicable when the user has chosen the attributes for beautifying only sections of that textual element type in other documents. In some embodiments, default attributes for a textual element are chosen based on usage by other users when specifically beautifying sections of that type of textual element.

In some embodiments, the presenting of the ordered list of the highest-ranked attributes is in a graphical user interface (GUI) that highlights the selected sections affected by the attribute changes. This allows the user to see the extent of the change before actually having the changes applied to the document.

According to some embodiments, within a document's beautification, selections of text (e.g., sections) of a particular textual element type (e.g., title, formula, ordinary text, and the like) are beautified by a user's choosing of attributes (e.g., font size, style, effects, and so on) that are applied to the text of these sections. These attributes become applicable with respect to the textual element. As such, during beautification of later sections of the document that are that same textual element, an ordered list of the most applicable (e.g., most used, highest ranking) attributes applicable to the textual element are automatically presented to the user. The user thus can easily choose appropriate choices for attributes of later sections of a document based on what was chosen for earlier sections of the document.

Numerous applications for the techniques provided herein will be apparent in light of this disclosure. One specific example use-case includes a computer-implemented method of beautifying an electronic textual document. The method can be implemented by a processor, such as a computer processor, a microprocessor, a word processor running on a personal computing device, or the like.

General Overview

In various embodiments of the present disclosure, intelligent tools are provided for a desktop publishing application that reduce, minimize, or eliminate the editorial effort of applying design choices in a consistent fashion and in the proper contexts throughout a document. For example, consider OPENTYPE® (format for scalable computer fonts) properties or attributes. A font usually has a number of OPENTYPE® features or attributes that can be decided by a font designer in beautifying a document. Example font features include font size, spacing, capitalization, and formatting, to name a few. Applications (such as desktop publishing applications) may present these properties to a user based on availability and applicability criteria to the particular portion or section of text being beautified. For example, the properties or attributes can be presented to the font designer through a GUI interface, such as a drop-down menu.

In other techniques, this presentation can be a fixed presentation. For instance, the presentation can use a fixed priority or order to present the possible attributes that can be changed, such as presenting the attributes in the same order in a drop-down list. Further, this priority or ordering can be kept fixed, such as always presenting the attributes in the same order. Under such a scheme, the most relevant suggestions (such as the most recent attributes selected) may not even show up on the drop-down menu. For example, in some cases, the most relevant suggestions may require scrolling or other interaction by the user to make visible. As such, the feature that would make the text presentation most appealing may not even appear to the designer doing the beautifying.

Thus, and in accordance with an embodiment, a technique for a self-learning model and apparatus is provided for smart feature suggestions based on textual analysis of a document being beautified by a designer. Using such a technique, the automatic presentation of applicable attributes for beautification may make use of contextual information based on, for example, earlier selections of attributes by the user on the same types of sections in the document. For ease of description, techniques discussed herein are primarily from the perspective of applying OPENTYPE® properties to beautifying text in the document, but other embodiments are not so limited. For example, in other embodiments, attribute changes to other features, such as paragraph layout, overall style, page format, formula generation, and so on, can be made with similar prioritization or presentation changes being reflected in GUI elements (e.g., drop-down menus, ribbons, contextual mouse selection, and the like). In accordance with an embodiment, rather than simply present options based only on considerations such as which attribute changes are available or applicable, the current context of the user document is factored into the presentation of available or applicable attribute changes, such as which attribute changes were used in similar sections (e.g., the same type of section) already beautified in the current document.

In one specific example embodiment, the process of beautification is broken down into several modules, including a context identification module, a feature identification module, a feature ranking module, and a user feedback module. The context identification module analyzes the context of a selected section of the document being beautified and classifies the section as one of a plurality of different textual elements (e.g., heading, formula, body, and so on). The feature identification module identifies attributes (e.g., textual design changes available or applicable to the selected textual element). The feature ranking module ranks the identified features (or attributes) for the current context based on, for example, recent selections by the user made in comparable contexts in the document, or that the user made in other similar documents in similar textual contexts, or that other users made in other similar documents in similar textual contexts. For example, in some such embodiments, the feature ranking module ranks recently selected attributes for a particular textual element higher than attributes that have not been recently selected.

The user feedback module obtains feedback from user selections of the ranked attributes (or any selection of an attribute, for that matter). For example, in one embodiment, for each of the different textual elements within a document, the user feedback module maintains a score for each attribute used to beautify that type of textual element. The scores may be initialized, for instance, based on attributes selected by the user in other such documents (e.g., giving such attributes higher scores initially), or selected by other users when beautifying such documents. Then, where the user selects or otherwise chooses the attribute to apply to a section of a particular textual element, the score for that attribute (and textual element) is increased. Accordingly, as the user beautifies the documents, the frequently selected attributes get progressively higher scores relative to the other (e.g., unselected) attributes, causing those chosen attributes to rank higher by the feature ranking module in this document (and possibly future documents beautified by the user).

In one or more embodiments, the context identification is assumed to be application- or use-case specific. For example, in one embodiment, a heuristic model of the classification is constructed that considers various factors (such as types and arrangement of characters in words and other expressions) in the sections of text being classified. The heuristic model then classifies the sections into a set (for example, a predefined set) of classes, as will be discussed in greater detail below. However, other embodiments are not so limited, and applications (such as desktop publishing applications) may use other techniques to identify the context.

Architecture and Methodology

FIG. 1 is a schematic diagram of an example network computing environment 100 for implementing a self-learning model and apparatus for smart feature suggestions based on textual analysis, according to an embodiment of the present disclosure. In FIG. 1, users 160, 170, and 180 beautify source documents stored on local devices (e.g., personal computer 160, smartphone 170, or other computing device, such as a tablet computer, workstation, personal digital assistant (PDA), to name a few) or remotely (such as on server 150 (e.g., as accessed by client computer 180), server 140 (e.g., as accessed through communication network 110, for example, the Internet), document storage cloud 120, or other remote storage device). The users 160, 170, and 180 beautify the source documents using self-learning models and apparatuses, such as tools available on local computing devices (e.g., personal computer 160, smartphone 170, or other computing device) or remote computing devices, such as server 150, server 140, or application storage cloud 130.

In some embodiments, the tools present interfaces, such as GUIs, to the users 160, 170, and 180, to enable beautifying of the source documents. The GUIs may present options, such as prioritized options in a drop-down menu, for beautifying the text of the source documents. In one or more embodiments, the order of the prioritized options changes dynamically to reflect options selected when the users 160, 170, and 180 were beautifying similar sections of text in earlier or other portions of the source documents.

FIG. 2 is a block diagram illustrating an example apparatus 200 for document beautification using smart feature suggestions based on textual analysis, according to an embodiment of the present disclosure. A user beautifies a document using the apparatus 200. The apparatus 200 may be a customer desktop publishing device, such as a workstation, personal computer, or laptop computer configured to do desktop publishing. One or more components of the apparatus 200 may be software or firmware, configured to execute on a computer processor and carry out the smart feature suggestions based on textual analysis as described herein.

Desktop publication applications can support various kinds of text-related features for text objects, such as ligatures, discretionary ligatures, small-caps, fractions, swashes, and so on. Each of these or similar features can be best suited for a particular section or textual element. For instance, swashes can be best suited for the title of the document, while discretionary ligatures may be best suited in the body of the document, but not in the footer section. In addition, fractions or tabular figures may make more sense when numbers are part of a paragraph. Similar rules can be described in general for other textual elements of a document or determined dynamically as part of a document's beautification.

Referring to FIG. 2, user selected text 205 of a document being beautified is input to the apparatus 200. The user intends to apply attributes to the selected text 205. The apparatus 200 may have a number (e.g., a predetermined number) of different textual elements or classes into which the different sections of the document are classified. These can include titles and sub-titles, mathematical and chemical formulas, fractions, dates, numbers between text, acronyms, foreign words (such as words or phrases in languages other than the language of the document), proper nouns (such as names or places), and the like. Accordingly, the user selected text 205 may include sections of text corresponding to one or more of these classes (or textual elements). The selection 205 can be small (such as a character or a word) or large (such as a paragraph, a text frame, or a substantial portion of a document) or somewhere in between (such as a sentence or formula). The selection can include portions of a section, or entire sections, of one or many different types of textual elements (or classes).

A classification module 210 is used to classify the user selected text 205. In some embodiments, the entire selection is used to classify it as one of the pre-determined classes (e.g., as the first class encountered, or as the most predominant class encountered, or as the highest class encountered in an ordered list or hierarchy of classes, or the like). In some other embodiments, the entire selection is used to classify it into one or more of the textual elements (e.g., each of the textual elements represented by the one or more of the selected sections, or portions thereof). In one or more embodiments, heuristic rules are used for the classification. By way of example, the apparatus 200 may classify the selection as one of the pre-defined classes based on a heuristics model on certain attributes of the existing text. For examples, titles may be set apart from other sections of text by their use of larger font sizes or use of capitalization in locations other than first character of a phrase. The classification module 210 outputs the detected context 215 based on these heuristics.

In further detail, in an example embodiment, heuristic rules are implemented for each of the above example classes. Titles and sub-titles are identified by font size. For example, average, minimum, and maximum font sizes can be maintained for the document. Then any text larger than average can be assumed to be a title or sub-title (such as maximum font size text being a title and text between the average and maximum font size being a sub-title). Other heuristic rules can include the use of all capitals or initial capitals in consecutive words to indicate a title or sub-title. Still other rules can include the use of underlining to indicate a title or sub-title. With mathematical or chemical formulas, the use of alphanumeric words or consecutive characters can be used to indicate a formula. Other indicators include the use of certain symbols or conventions (such as single characters that are not otherwise normal punctuation, or two-letter combinations (with an initial capital) of recognized chemical element identifiers) that are generally indicative of a formula can be used. For example, possible chemical formulas can be further parsed to see if they are a valid formula prior to being classified as such.

Continuing with example heuristic rules, fractions can be identified by a single "l" between numbers, while dates can follow certain established or standard formats for writing dates. In addition, foreign words can be identified as not belonging to the language of the document, but belonging to another language. For example, the classification module 210 can maintain dictionaries of various languages including the document's language. In one embodiment, the classification module 210 can establish the language of the document by identifying the number of words for each language and identifying the language with the most number of words (e.g., the dominant language) in the document as being the document's language and all other words being foreign words. Other rules for foreign words can include the use of certain conventions such as italics to indicate foreign words. In a similar vein, proper nouns can be identified using techniques similar to foreign words, such as using dictionaries of proper nouns.

The classification 215 is input to a ranking module 220, which uses, for example, a ranking model algorithm to rank a set of applicable attributes for the determined context 215 (e.g., textual element or elements). Numerous attributes (e.g., hundreds, or even thousands when considered in combination or with finely tunable parameters) are available to modify sections of text. Attributes such as font size, characteristics, features, contexts, and so on can present a seemingly endless array of choices for the user or designer. However, in any given document, only a relatively few of these attributes are used, based on factors such as what type of textual elements are represented in the selected text, what is ordinarily used in other similar documents of the user or other designers, what has been used so far in the current document by the user, what is in the existing text before beautification, and the like. Accordingly, in some embodiments, for each textual element, a set of applicable attributes is maintained by the apparatus 200. This set can be defaulted to a group of common attributes (e.g., small caps for title), such as what other users use in such documents (or the current user used in earlier beautified documents), and new attributes added for a particular textual element when the user specifically chooses that attribute for applying to a particular section that is representative of that textual element.

To each such maintained attribute (and for each textual element), a score or trained weight (or other such ranking criteria) is tracked and updated. For example, applying such an attribute to a selected section of a particular type of textual element increases the score or weight of that attribute relative to the other applicable attributes of that textual element (as well as adds the attribute to the set of applicable attributes for that textual element, if the attribute was not already there). The output of the ranking module 220 is an ordered list of attributes (or features), such as a first feature 222, a second feature 224, and so on, down to an nth feature 228. For example, in some embodiments, n=5. However, the value of n can vary in some other embodiments. The first feature 222 is the most relevant (e.g., highest scoring or highest ranking) attribute for this textual element, the second feature 224 is the second most relevant, and so on. Successive applying of the same attribute to sections of a particular textual element eventually causes that attribute to be the highest-ranking feature for that textual element.

In further detail, in one embodiment, the user selected text 205 is considered for finding the right set of features to suggest. The classifying module 210 processes each word in the selected text and decides possible textual elements by which to classify the word. The possible classifications can be ranked such as by simple precedence (e.g., title, then formula, then fraction, then date, then proper noun, then foreign word, and so on) and the most dominant one chosen. In another embodiment, consecutive words are considered (e.g., consecutive words sharing a common textual element are both considered to be that textual element versus considering each word in isolation). As such, sections of consecutive words are formed, each section being representative of one of the textual elements. The classification 215 of the entire selection 205 can be based, for example, on the most numerous of the textual elements within the selection 205. Once the class 215 of the selection 205 is identified, the features rank 222, 224, . . . , 228 can be based on a single look-up table that contains the scores for each feature for a particular class. The cells of the look-up table can identify the score for a particular feature for the context class. All the features can be ranked in the descending order of their respective scores and the top n features passed to the application for suggestion. The parameter n can be preset (such as n=5) or be customized, depending on the embodiment (e.g., user requirements or preferences).

In some embodiments, the detected context 215 includes multiple textual elements, such as one for each different textual element represented by the sections in the selected text 205. Accordingly, the ranked features 222, 224, . . . , 228 include attributes from the applicable attributes of some or all of the textual elements represented in the selected text 205. For instance, in one embodiment, the ranking module 220 ranks each of the applicable attributes within each textual element, and then merges the highest-ranking attributes from each of the represented textual elements in the detected context 215 to create the ranked features 222, 224, ..., 228. In another embodiment, the ranking module 220 merges all of the applicable attributes from all of the textual elements, ranks them based on their scores or weights, and selects the top n attributes regardless of the representation of the different textual elements in the selected n attributes.

The selected features 222, 224, ..., 228 are input to a graphical user interface (GUI) 230 for presentation to the user. For instance, in one embodiment, the GUI 230 presents the features in a drop-down menu in descending order from highest scoring (at the top) to nth highest scoring (at the bottom). The user selects the feature or features that the user wants to apply over the selected text 205. In some embodiments, the portions of the selected text 205 affected by the selected attribute or attributes (and associated textual element or elements, if more than one textual element is represented by the features 222, 224, ..., 228) are highlighted to the user, to distinguish from the remainder of the selected text 205 (that is not affected by the selected attribute or attributes). The selected features by the user or designer are applied 235 by the apparatus 200 to the document (or rather, to the selected sections representative of the textual elements whose attributes were selected from the GUI 230).

In addition, in some embodiments, a ranking training module 240 records the user's choice or choices and adjusts the weights of the classification-feature network to reflect the choice(s) of the user or designer. For example, the weights of the selected features (and textual elements) are increased relative to the weights of any unselected features. As such, the ranking model is trained based on this feedback to generate new weights 245 for the network to be used in subsequent queries from the user. Accordingly, the apparatus 200 functions as a self-learning model for smart feature suggestions based on textual analysis.

Figure 3B:
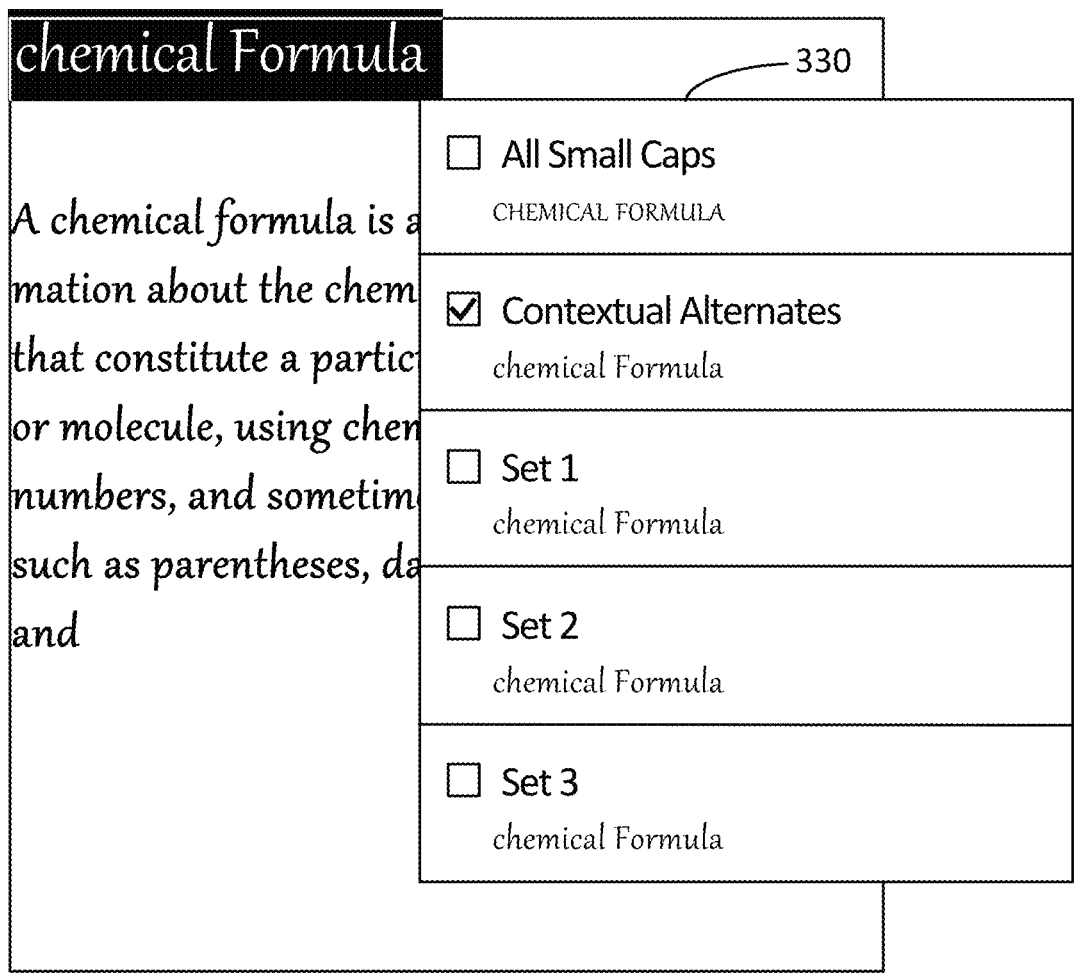

FIGS. 3A-3B are screen shots of an example graphical user interface (GUI) for smart feature suggestions based on textual analysis, according to an embodiment of the present disclosure. In FIGS. 3A-3B, a document is being beautified, particularly a text selection 310. The selection 310 has various font aspects, such as initial caps and larger font, which are indicators of a title. In FIG. 3A, the title 310 is being beautified early in the design process, the system having no knowledge of the user's inclination to use small caps for titles. Accordingly, the GUI presentation 320 of suggested attributes is just a generic list. However, in FIG. 3B, the beautification process is a little further along, and the user has been applying the small caps attribute to titles. Accordingly, the GUI suggestion list 330 has small caps as the first suggested attribute to use on the title 310. In another embodiment, small caps is a default attribute for titles, so the user is presented with a list similar to list 330 from the outset.

FIGS. 4A-4B are screen shots of an example graphical user interface (GUI) for smart feature suggestions based on textual analysis, according to another embodiment of the present disclosure. In FIGS. 4A-4B, a different portion of the document in FIGS. 3A-3B is being beautified, in this case a chemical formula 410 and a word right before the chemical formula. In FIG. 4A, the system identifies the selected text as including a chemical formula, so presents a GUI list 420 including subscript as the first suggestion. However, the user has sometimes applied small caps to a chemical formula (e.g., in other documents beautified by the user), so that attribute shows up second in the list 420. It should be noted that GUI list 420 shows a preview (for each attribute) of how the selected text 410 will look after application of the corresponding attribute. In some embodiments, the selected text 410 is highlighted to show the portions affected by any selected attribute from the list 420. In FIG. 4B, the situation is similar to that in FIG. 4A, only the user has been beautifying by applying small caps to chemical formulas. Accordingly, the system increases the weight of the small caps attribute for chemical formulas over time and small caps is now displayed in the GUI list 430 as the top suggested attribute to apply to the selected text 410.

In one or more embodiments of the present disclosure, each feature (or attribute) is initially given equal weight for all the classes (or textual elements). A training model can then be run over test data to update the weights appropriately (e.g., initialize the weights to values more reflective of good attribute defaults for the different classes). For instance, data used for the training can be historical data collected from users who have applied these features to beautify their documents. Over time, the model will have substantial data to reflect the weights properly with minimal or negligible deviations from further iterations. At that point, designer preference will adjust the initialized weights with values more reflective of the designer's beautifying tastes or requirements.

In some embodiments, training for the ranking module is local: the ranking module only considers actions taken by the current user (e.g., local training). For instance, after initializing the weights as described above, further adjustments are from the user's actions (e.g., the user's selections or choices of attributes for particular textual elements), either on the current document or previous documents beautified by the user. As such, the weights of the ranking modules can vary between different users based on the features they use more often. This is useful when users want to use some features more often than the general user base. This technique caters to the style of each user individually. It also responds quickly to changes in a user's style. In one embodiment, the user's weight training data remains on a client computer dedicated to the user, with no weight data sent or stored on a central server.

In some other embodiments, all weight training (e.g., ranking) takes place globally, pooling the attribute selections of many users (e.g., global training). Here, the ranking module takes into account the selections of all the users in generating attribute weights for the different textual element types. As such, the weights of all the users in this model are the same, and each user sees the same ordered list of suggested attributes in the same context. This technique helps users in discovering more features used frequently by other designers. Accordingly, the recommendations in this technique are established from a large user pool, so represent relatively standard or ordinary beautification features. Further, unless two attributes have nearly identical weights, the suggestions proposed with this technique stay relatively fixed from day to day. In one embodiment, the training takes place on a central server, which can serve as a convenient repository for all the different user's contributions to the global weights.

In still some other embodiments, weight training takes place both locally and globally (e.g., hybrid training). Here, the usage of the current user can have higher weightings than from other users, to allow for personalization. However, weightings from global users still cause global preferences to appear in the suggested attribute lists (perhaps fewer of them, or appearing lower on the list). Accordingly, the weights for each user would be different, but still reflect the global trend as well as the user's own style. This technique helps users get established with common or routine beautifications, as well as allows the users to gradually displace some of those choices with the user's own tastes once the users are comfortable doing so.

Figure 6:
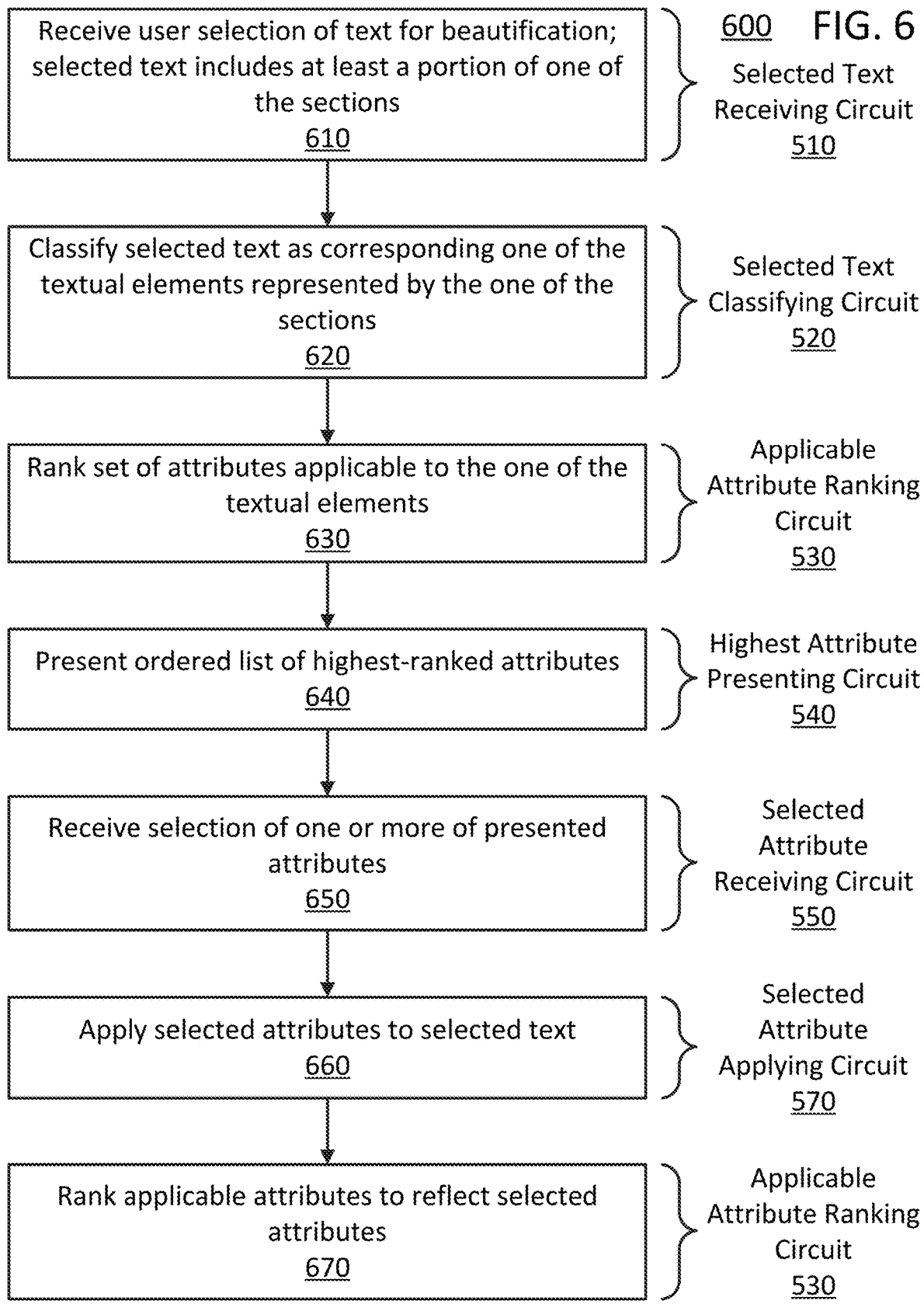
FIG. 6 is a flow diagram of an example method of textual document beautification, according to an embodiment of the present disclosure.

FIG. 5 is a block diagram of an example textual document beautification circuit 500 as might be used in the apparatus 200 of FIG. 2, according to an embodiment of the present disclosure. For instance, some of the components of the beautification circuit 500 of FIG. 5 can be example circuits that perform the roles of the different components of the apparatus 200 of FIG. 2, as discussed more below. FIG. 6 is a flow diagram of an example method 600 of textual document beautification, according to an embodiment of the present disclosure.

Method 600 and other methods described herein may be implemented in hardware or software, or some combination of the two. For example, method 600 may be implemented by the textual document beautification circuit 500 of FIG. 5. In another embodiment, method 600 may be implemented be a custom circuit such as a field programmable gate array (FPGA) configured to carry out the method 600. In some other embodiments, method 600 may be implemented as a series of computer instructions, such as software, firmware, or a combination of the two, together with one or more computer processors (e.g., one or more microprocessors). The instructions, when executed on a given processor, cause method 600 to be performed. For example, in one or more embodiments, a computer program product is provided. The computer program product includes one or more non-transitory machine-readable mediums (such as a compact disc, a digital video disc (DVD), a solid-state drive, a hard drive, random-access memory (RAM), read-only memory (ROM), on-chip processor cache, or the like) encoded with instructions that when executed by a plurality of computers cause method 600 (or other method described herein) to be carried out for textual document beautification. In some embodiments, the machine-readable medium is on a non-transitory storage device accessible by a server or cloud-based computer over a network.

As will be appreciated, method 600 may be carried out in a distributed manner (such as on more than one computing device or processing core. In addition, while the methods described herein may appear to have a certain order to their operations, other embodiments may not be so limited. Accordingly, the order of the operations can be varied between embodiments, as would be apparent in light of this disclosure. In addition, some of the operations are optional, and may appear in some embodiments but not in others.

In a similar light, the beautification circuit 500 and other circuits disclosed herein may be custom hardware circuits or general-purpose computer hardware configured (e.g., through software, firmware, customized logic, to name a few) to carry out the tasks assigned to the circuit. While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit.

Referring to the textual document beautification circuit 500 of FIG. 5, a user inputs selected text 505 of a textual document to the beautification circuit 500. A selected text receiving circuit 510 receives this selection of text 505 and passes the selected text 505 onto a selected text classifying circuit 520, which classifies the selected text 505 into one or more textual elements. The selected text classifying circuit 520 is an example circuit that can perform the role of the classification module 210 in FIG. 2. The classifying is based, for example, on heuristic rules to break the selected text 505 into sections, each of the sections corresponding to (or representative of) one of the textual elements. This classifying is passed to an applicable attribute ranking circuit 530, which ranks applicable attributes for the one or more textual elements represented in the selected text 505. The applicable attribute ranking circuit 530 is an example circuit that can perform the role of the ranking module 220 in FIG. 2. The ranked attributes are passed to a highest attribute presenting circuit 540, which presents an ordered list of applicable attributes 535 to the user (e.g., through a GUI interface) based on the ranked attributes. The highest attribute presenting circuit 540 is an example circuit that can perform the role of the GUI 230 in FIG. 2.

The user selects one or more of the attributes 545, and the selected attributes 545 are passed to a selected attribute receiving circuit 550, which passes the selected attributes 545 to a selected text highlighting circuit 560. The selected text highlighting circuit 560 highlights portions 555 of the selected text 505 corresponding to the textual elements affected by the selected attributes 545. For example, in one embodiment, the entire sections 555 of text corresponding to each affected textual element are highlighted, while in another embodiment, only those characters or words 555 of the selected text 505 undergoing changes as a result of the selected attributes are highlighted. The highlighting visually distinguishes those portions of text 555 undergoing changes (or otherwise affected) as a result of the selected attributes 545 from a remainder of the selected text 505 that is not affected by the selected attributes 545. The selected attributes 545 are then passed to a selected attribute applying circuit 570, which applies the attributes 545 to the affected sections in the selected text 505. The selected attributes 545 are then passed back to the applicable attribute ranking circuit 530, which updates (e.g., reranks) the rankings of the attributes for the affected textual elements to reflect the selected attributes 545. For example, the selected attributes 545 can be ranked relatively higher so that they appear higher in the GUI presented attributes 535 in future attribute presentations by the highest attribute presenting circuit 540. The applicable attribute ranking circuit 530 is an example circuit that can perform the role of the ranking training module 240 in FIG. 2.

Method 600 of FIG. 6 is a computer-implemented method of beautifying an electronic textual document. The document has text organized in a plurality of sections. Each of the sections is representative of a corresponding one of a plurality of textual elements. Referring to FIG. 6, method 600 begins with receiving 610 a user selection of the text for beautification. The selected text includes at least a portion of one of the sections. For example, the receiving 610 can be performed by the selected text receiving circuit 510 of FIG. 5. Method 600 further includes classifying 620 the selected text as the corresponding one of the textual elements represented by the one of the sections. For example, the classifying can be performed by the selected text classifying circuit 520 of FIG. 5. Method 600 further includes ranking 630 a set of attributes applicable to the one of the textual elements. For example, the ranking 630 can be performed by the applicable attribute ranking circuit 530 of FIG. 5.

Method 600 further includes presenting 640 an ordered list of the highest-ranked attributes. For example, the presenting 640 can be performed by the highest attribute presenting circuit 540 of FIG. 5. Method 600 further includes receiving 650 a selection of one or more of the presented attributes. For example, the receiving 650 can be performed by the selected attribute receiving circuit 550 of FIG. 5. Method 600 further includes applying 660 the selected attributes to the selected text. For example, the applying 660 can be performed by the selected attribute applying circuit 570 of FIG. 5. Method 600 further includes reranking 670 the applicable attributes to reflect the selected attributes. For example, the reranking 670 can be performed by the applicable attribute ranking circuit 530 of FIG. 5.

FIG. 7 is a flow diagram of an example method 700 of textual document beautification, according to another embodiment of the present disclosure. For example, method 700 can be performed by the textual document beautification circuit 500 of FIG. 5 as discussed above for method 600. Method 700, like method 600, is a computer-implemented method of beautifying an electronic textual document. The documents has text organized in a plurality of sections. Each of the sections is representative of a corresponding one of a plurality of textual elements.

In method 700, processing begins with receiving 710 a user selection of the text for beautification. The selected text includes at least a portion of at least one of the sections. Method 700 further includes classifying 720 the selected text into a corresponding one or more of the textual elements of which the at least one of the sections are representative, ranking 730 a set of attributes applicable to the one or more of the textual elements, presenting 740 an ordered list of the highest-ranked attributes, receiving 750 a selection of one or more of the presented attributes, and highlighting 760 those portions of the selected text to which the selected attributes apply to visually distinguish from a remainder of the selected text to which the selected attributes do not apply. For example, the highlighting 760 can be performed by the selected text highlighting circuit 560 of FIG. 5. Method 700 further includes applying 770 the selected attributes to the selected text. Each selected attribute is applied to the portion of the selected text that corresponds to those of the one or more of the textual elements to which the selected attribute is applicable.

Further Example Embodiments

The following examples pertain to further embodiments, from which numerous permutations and configurations will be apparent.

Example 1 is a computer program product including one or more non-transitory machine-readable mediums encoded with instructions thereon that when executed by one or more processors cause a process to be carried out for beautifying an electronic textual document having text organized in a plurality of sections, each of the sections being representative of a corresponding one of a plurality of textual elements. The process includes: receiving a user selection of the text for beautification, the selected text including at least a portion of one of the sections; classifying the selected text as the corresponding one of the textual elements represented by the one of the sections; ranking a set of attributes applicable to the one of the textual elements; presenting an ordered list of at least the highest-ranked attributes; in response to receiving a selection of one or more of the presented attributes, applying the selected attributes to the selected text; and reranking the applicable attributes to reflect the selected attributes.

Example 2 includes the subject matter of Example 1, where the classifying of the selected text includes applying heuristic rules to the at least a portion of the one of the sections to classify the selected text as the one of the textual elements.

Example 3 includes the subject matter of Example 1, where the ranking of the applicable attributes includes basing the ranking at least in part on selections from the applicable attributes by a given user when beautifying other textual documents, the given user having provided the user selection of the text for beautification.

Example 4 includes the subject matter of Example 1, where the ranking of the applicable attributes includes basing the ranking at least in part on selections from the applicable attributes by other users when beautifying other textual documents, the other users being different from a given user, the given user having provided the user selection of the text for beautification.

Example 5 includes the subject matter of Example 1, the process further including: receiving a second selection of the text for beautification, the second selected text including at least a portion of another one of the sections, the other one of the sections being representative of the one of the textual elements; classifying the second selected text as the one of the textual elements; in response to receiving a user-chosen attribute for the second selected text, applying the chosen attribute to the second selected text; and modifying the applicable attributes to reflect the chosen attribute.

Example 6 includes the subject matter of Example 5, where the modifying of the applicable attributes includes: adding the chosen attribute to the applicable attributes if the chosen attribute is not a member of the applicable attributes; and reranking the applicable attributes to reflect the chosen attribute.

Example 7 is a computer-implemented method of beautifying an electronic textual document having text organized in a plurality of sections, each of the sections being representative of a corresponding one of a plurality of textual elements. The method includes: receiving, by a processor, a user selection of the text for beautification, the selected text including at least a portion of at least one of the sections; classifying, by the processor, the selected text into a corresponding one or more of the textual elements of which the at least one of the sections are representative; ranking, by the processor, a set of attributes applicable to the one or more of the textual elements; presenting, by the processor, an ordered list of at least the highest-ranked attributes; and in response to receiving, by the processor, a selection of one or more of the presented attributes, applying the selected attributes to the selected text, each selected attribute being applied to a portion of the selected text that corresponds to those of the one or more of the textual elements to which the selected attribute is applicable.

Example 8 includes the subject matter of Example 7, where the classifying of the selected text includes: identifying the at least a portion of the at least one of the sections from the selected text; and classifying the identified at least a portion of the at least one of the sections into the corresponding one or more of the textual elements to which the identified at least one of the sections are representative.

Example 9 includes the subject matter of Example 8, where the classifying of the identified at least a portion of the at least one of the sections includes applying heuristic rules to each section of the at least a portion of the at least one of the sections to classify the section as a corresponding one of the one or more of the textual elements.

Example 10 includes the subject matter of Example 7, where the ranking of the applicable attributes includes basing the ranking at least in part on selections from the applicable attributes by a given user when beautifying other textual documents, the given user having provided the user selection of the text for beautification.

Example 11 includes the subject matter of Example 7, where the ranking of the applicable attributes includes basing the ranking at least in part on selections from the applicable attributes of other users when beautifying other textual documents, the other users being different from a given user, the given user having provided the user selection of the text for beautification.

Example 12 includes the subject matter of Example 7, further including highlighting those portions of the selected text to which the selected attributes apply to visually distinguish from a remainder of the selected text to which the selected attributes do not apply.

Example 13 includes the subject matter of Example 7, further including reranking, by the processor, the applicable attributes to reflect the selected attributes.

Example 14 includes the subject matter of Example 7, further including: receiving, by the processor, a second selection of the text for beautification, the second selected text including at least a portion of one of the sections, the one of the sections being representative of the one of the textual elements; classifying, by the processor, the second selected text as the one of the textual elements; in response to receiving, by the processor, a user-chosen attribute for the second selected text, applying the chosen attribute to the second selected text; and modifying, by the processor, the applicable attributes to reflect the chosen attribute.

Example 15 includes the subject matter of Example 14, where the modifying of the applicable attributes includes: adding the chosen attribute to the applicable attributes if the chosen attribute is not a member of the applicable attributes; and reranking the applicable attributes to reflect the chosen attribute.

Example 16 is a computer-based system for beautifying an electronic textual document having text organized in a plurality of sections, each of the sections being representative of a corresponding one of a plurality of textual elements. The system includes: a selected text receiving circuit to receive a user selection of the text for beautification, the selected text including at least a portion of at least one of the sections; a selected text classifying circuit to classify the selected text into a corresponding one or more of the textual elements of which the at least one of the sections are representative; an applicable attribute ranking circuit to rank a set of attributes applicable to the one or more of the textual elements; a highest attribute presenting circuit to present an ordered list of at least the highest-ranked attributes; a selected attribute receiving circuit to receive a selection of one or more of the presented attributes; and a selected attribute applying circuit to apply the selected attributes to the selected text, each selected attribute being applied to a portion of the selected text that corresponds to those of the one or more of the textual elements to which the selected attribute is applicable.

Example 17 includes the subject matter of Example 16, further including a selected attribute highlighting circuit to highlight those portions of the selected text to which the selected attributes apply to visually distinguish from a remainder of the selected text to which the selected attributes do not apply.

Example 18 includes the subject matter of Example 16, where the applicable attribute ranking circuit is further to rerank the applicable attributes to reflect the selected attributes.

Example 19 includes the subject matter of Example 16, where: the selected text receiving circuit is further to receive a second selection of the text for beautification, the second selected text including at least a portion of one of the sections, the one of the sections being representative of the one of the textual elements; the selected text classifying circuit is further to classify the second selected text as the one of the textual elements; the selected attribute receiving circuit is further to receive a user-chosen attribute for the second selected text; the selected attribute applying circuit is further to apply the chosen attribute to the second selected text; and the applicable attribute ranking circuit is further to modify the applicable attributes to reflect the chosen attribute.

Example 20 includes the subject matter of Example 19, where the applicable attribute ranking circuit is further to: add the chosen attribute to the applicable attributes if the chosen attribute is not a member of the applicable attributes; and rerank the applicable attributes to reflect the chosen attribute.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A computer-implemented method of beautifying an electronic document comprising text that is organized in a plurality of sections, the method comprising:
receiving, by a processor, a first user input that defines a selection of text from the electronic document;
classifying, by the processor, at least a portion of the selection of text as a first instance of a particular class of textual element, wherein the particular class of textual element is one of a plurality of classes defined before receipt of the first user input, wherein the electronic document includes the first instance of the particular class of textual element and a second instance of the particular class of textual element, wherein the first and second instances of the particular class of textual element each comprise different text, and wherein the first and second instances of the particular class of textual element each have different sets of formatting attributes and are formatted differently in the electronic document;

ranking, by the processor, the set of formatting attributes of the second instance of the particular class of textual element;

presenting, by the processor, an ordered list of at least a portion of the ranked set of formatting attributes of the second instance of the particular class of textual element; and in response to receiving, by the processor, a second user input that identifies a selected formatting attribute from the ordered list, applying the selected formatting attribute to the first instance of the particular class of textual element.

2. The computer-implemented method of claim 1, wherein the portion of the selection of text is initially classified as a plurality of possible classifications, and wherein the particular class is selected from amongst the plurality of possible classifications based on a classification precedence.

3. The computer-implemented method of claim 1, wherein classifying the portion of the selection of text comprises applying one or more heuristic rules to classify the portion of the selection of text as the first instance of the particular class of textual element.

4. The computer-implemented method of claim 1, wherein ranking the set of formatting attributes is at least partially based on selection of one or more of the formatting attributes when beautifying other electronic documents.

5. The computer-implemented method of claim 1, wherein:
a first user provides the first user input;
ranking the set of formatting attributes is at least partially based on selection of one or more of the formatting attributes by a second user when beautifying other electronic documents; and
the first user is different from the second user.

6. The computer-implemented method of claim 1, further comprising highlighting the second instance of the particular class of textual element.

7. The computer-implemented method of claim 1, further comprising re-ranking, by the processor, the ordered list in response to the second user input.

8. The computer-implemented method of claim 1, further comprising:
receiving, by the processor, a third user input that defines a second selection of text from the electronic document;
classifying, by the processor, at least a portion of the second selection of text as a third instance of the particular class of textual element; and
in response to receiving, by the processor, a fourth user input that identifies the selected formatting attribute, applying the selected formatting attribute to the third instance of the particular class of textual element.

9. The computer-implemented method of claim 1, further comprising:
receiving, by the processor, a third user input that defines a second selection of text from the electronic document;
classifying, by the processor, at least a portion of the second selection of text as a third instance of the particular class of textual element; and
in response to receiving, by the processor, a fourth user input that identifies a second selected formatting attribute, applying the second selected formatting attribute to the third instance of the particular class of textual element.

10. A non-transitory machine-readable medium encoded with instructions that, when executed by one or more processors, cause a process to be carried out for beautifying an electronic document comprising text that is organized in a plurality of sections, the process comprising:
receiving a first user input that defines a selection of text from the electronic document;
classifying at least a portion of the selection of text as a first instance of a particular class of textual element, wherein the particular class of textual element is one of a plurality of classes defined before receipt of the first user input, wherein the electronic document includes the first instance of the particular class of textual element and a second instance of the particular class of textual element, wherein the first and second instances of the particular class of textual element each comprise different text, and wherein the first and second instances of the particular class of textual element each have different sets of formatting attributes and are formatted differently in the electronic document;
ranking the set of formatting attributes of the second instance of the particular class of textual element;
presenting an ordered list of at least a portion of the ranked set of formatting attributes of the second instance of the particular class of textual element; and
in response to receiving a second user input that identifies a selected formatting attribute from the ordered list, applying the selected formatting attribute to the first instance of the particular class of textual element.

11. The non-transitory machine-readable medium of claim 10, wherein the process further comprises re-ranking the ordered list in response to the second user input.

12. The non-transitory machine-readable medium of claim 10, wherein classifying the portion of the selection of text comprises applying a heuristic rule to classify the portion of the selection of text as the first instance of the particular class of textual element.

13. The non-transitory machine-readable medium of claim 10, wherein ranking the set of formatting attributes is at least partially based on selection of one or more of the formatting attributes when beautifying other electronic documents.

14. The non-transitory machine-readable medium of claim 10, wherein:
a first user provides the first user input;
ranking the set of formatting attributes is at least partially based on selection of one or more of the formatting attributes by a second user while beautifying other electronic documents; and
the first user is different from the second user.

15. The non-transitory machine-readable medium of claim 10, the process further comprising:
receiving a third user input that defines a second selection of text from the electronic document;
classifying at least a portion of the second selection of text as a third instance of the particular class of textual element; and
in response to receiving a fourth user input that identifies the selected formatting attribute, applying the selected formatting attribute to the third instance of the particular class of textual element.

16. The non-transitory machine-readable medium of claim 10, the process further comprising:
receiving a third user input that defines a second selection of text from the electronic document;

classifying at least a portion of the second selection of text as a third instance of the particular class of textual element; and in response to receiving a fourth user input that identifies a second selected formatting attribute, applying the second selected formatting attribute to the third instance of the particular class of textual element.

17. A computer-based system for beautifying an electronic document comprising text that is organized in a plurality of sections, the system comprising a processor that is adapted to:

receive a first user input that defines a selection of text from the electronic document;

classify at least a portion of the selection of text as a first instance of a particular class of textual element, wherein the particular class of textual element is one of a plurality of classes defined before receipt of the first user input, wherein the electronic document includes the first instance of the particular class of textual element and a second instance of the particular class of textual element, wherein the first and second instances of the particular class of textual element each comprise different text, and wherein the first and second instances of the particular class of textual element each have different sets of formatting attributes and are formatted differently in the electronic document;

rank the set of formatting attributes of the second instance of the particular class of textual element;

present an ordered list of at least a portion of the ranked set of formatting attributes of the second instance of the particular class of textual element;

receive a second user input that identifies a selected formatting attribute from the ordered list; and apply the selected formatting attribute to the first instance of the particular class of textual element.

18. The system of claim 17, wherein the processor is further adapted to highlight the second instance of the particular class of textual element.

19. The system of claim 17, wherein the processor is further adapted to re-rank the ordered list in response to the second user input.

20. The system of claim 17, wherein the processor is further adapted to:

receive a third user input that defines a second selection of text from the electronic document;

classify at least a portion of the second selection of text as a third instance of the particular class of textual element;

receive a fourth user input that identifies the selected formatting attribute; and apply the selected formatting attribute to the third instance of the particular class of textual element.

* * * * *